United States Patent
Mayfield, jr. et al.

[11] Patent Number: 6,010,079
[45] Date of Patent: Jan. 4, 2000

[54] VEHICLE MOUNTED FLUID DELIVERY SYSTEM WITH RETRACTABLE ARM

[75] Inventors: John M. Mayfield, jr.; Ted E. Mayfield, both of Ukiah; Mark L. Natalizia, Willits, all of Calif.

[73] Assignee: Motivepower Investments Limited, Pittsburgh, Pa.

[21] Appl. No.: 08/925,653

[22] Filed: Sep. 9, 1997

[51] Int. Cl.[7] .................................................. B05B 1/20
[52] U.S. Cl. ........................ 239/165; 239/62; 239/99; 239/159; 239/172
[58] Field of Search ................... 239/62, 71, 99, 239/100, 146, 155, 159, 160, 161–166, 168, 169, 172, 173–175; 118/323

[56] References Cited

U.S. PATENT DOCUMENTS

| | | | |
|---|---|---|---|
| 4,230,280 | 10/1980 | Leigh et al. | 239/155 |
| 4,447,007 | 5/1984 | Farines | 239/165 |
| 4,718,439 | 1/1988 | Gorra et al. | 118/323 |
| 5,012,608 | 5/1991 | Brown | 239/173 |
| 5,280,685 | 1/1994 | Turner | 239/169 |
| 5,348,226 | 9/1994 | Heiniger et al. | 239/168 |
| 5,358,568 | 10/1994 | Okano et al. | 118/323 |
| 5,755,382 | 5/1998 | Skotinkov | 239/165 |

FOREIGN PATENT DOCUMENTS

| | | | |
|---|---|---|---|
| 2038153 | 7/1980 | United Kingdom | 239/168 |

OTHER PUBLICATIONS

Patchen® Selective Spray Systems, Los Gatos, California, brochure entitled "*Put A Stop To Rising Weed Control Costs*" (4 pages).

PBM, Chico, California, catalog pp. 12 and 24 for Skid Sprayers and Self–Propelled Sprayers.
PBM, Chico, California, catalog pp. 40–41, for Raven Industries SCS440 Control Console, SCS440 Sprayer System Components.

*Primary Examiner*—Andres Kashnikow
*Assistant Examiner*—Jorge Bocanegra
*Attorney, Agent, or Firm*—Knobbe, Martens Olson & Bear, LLP

[57] ABSTRACT

A mobile system for delivering a fluid to a fluid application area includes a vehicle, an arm carried by the vehicle and movable between a retracted position and an extended position, a fluid delivery system carried by the vehicle and including at least one fluid delivery device coupled too the arm, a mechanism for maneuvering the arm between the retracted position and the extended position, a sensor mounted on the vehicle for sensing the approach of an obstacle in the path of the arm, and a control circuit responsive to the sensor for causing the arm maneuvering mechanism to retract the arm towards the retracted position when the sensor detects an approaching potentially interfering obstacle and for extending the arm towards the extended position when the relative positions of the arm and the obstacle are no longer potentially interfering. A safety breakaway mechanism is incorporated into the system for enabling the arm to deflect when struck by an undetected obstacle. The control circuit optionally provides either a fixed cycle time or a variable cycle time. When operating over a variable cycle time, the control circuit includes a circuit for measuring the speed of the vehicle and a circuit for computing the length of the variable cycle time in accordance with the measured vehicle speed. The control circuit may be overridden by a vehicle occupant to directly operate the arm maneuvering mechanism.

13 Claims, 3 Drawing Sheets

6,010,079

VEHICLE MOUNTED FLUID DELIVERY SYSTEM WITH RETRACTABLE ARM

BACKGROUND OF THE INVENTION

This invention relates to mobile fluid delivery systems in general. More particularly, this invention relates to vehicle mounted fluid delivery systems for delivering desired amounts of fluid to a delivery area while a vehicle is in motion.

Mobile fluid delivery systems are used in a wide variety of applications, including weed abatement and control, fertilizer application for agricultural and landscaping purposes, mobile spray paint applications, and the like. In all such systems, a fluid delivery system is mounted on a vehicle, the fluid delivery system including one or more fluid ejectors mounted on appropriate portions of the vehicle in a manner designed to deliver the fluid in the appropriate pattern. For example, in weed control applications, a series of spray nozzles is typically mounted transversely of the rear of the vehicle and on a fixed or movable arm extending from one or both sides of the vehicle so that an appropriate herbicide can be sprayed in a pattern extending generally perpendicular to the path of the vehicle as well outwardly from the side of the vehicle. In the past, the fluid delivery system has typically been arranged for manual operation by the driver of the vehicle or an occupant of the vehicle. More recently, systems have been introduced (for weed control applications) in which automatic operation of the fluid delivery system is made possible by the use of a foliage sensing unit which generates a control signal indicating the presence of a weed to be sprayed with an herbicide.

All known mobile fluid delivery systems suffer from the disadvantage that potentially interfering obstacles, such as trees, telephone poles, boulders and the like must be taken into account when designing or operating a system. For example, for railroad weed control systems, care must be taken to ensure that any portion of the fluid delivery system which extends laterally of the rail truck be limited in length to avoid striking obstacles encountered along the side of the rail bed. This limits the lateral extent to which a weed control herbicide can be applied. For non-rail vehicles, such as herbicide spraying trucks and fertilizer trucks, the vehicle must be operated in such a manner as to maneuver around obstacles such as trees, telephone poles, boulders and the like. As a consequence, the efficiency with which such mobile fluid delivery systems can be operated is severely impaired, both with respect to the time required to complete a given fluid delivery project and the monetary cost of doing so.

SUMMARY OF THE INVENTION

The invention comprises a mobile system for delivering a fluid to a fluid application area which is devoid of the above noted disadvantages, which is relatively inexpensive to implement and which ensures optimum delivery of a desired fluid to one or more fluid application areas, regardless of the nature and number of lateral obstacles encountered.

In its broadest aspect, the invention comprises a vehicle, an arm carried by the vehicle and movable between a retracted position and an extended position, a fluid delivery system carried by the vehicle, the fluid delivery system including at least one fluid delivery device coupled to the arm, means for maneuvering the arm between the retracted position and the extended position, sensor means for sensing the approach of an obstacle in the path of the arm, and control means responsive to the sensor means for causing the arm maneuvering means to retract the arm towards the retracted position when the sensor means senses an approaching potentially interfering obstacle and for extending the arm towards the extended position when the relative positions of the arm and the obstacle are no longer potentially interfering.

The arm maneuvering means may comprise any one of a number of different types of actuators, such as an hydraulic actuator, an electric motor driven actuator and a pneumatic actuator.

The control means alternatively includes means for operating the arm maneuvering means for a fixed cycle time or a variable cycle time. For the variable cycle time embodiment, the control means includes means for measuring the speed of the vehicle and means for computing the length of the variable cycle time in accordance with the measured vehicle speed.

The system further includes manual override means for enabling a vehicle occupant to override the control means and directly operate the arm maneuvering means, if desired. Also, the system also includes a safety breakaway mechanism for enabling the arm maneuvering means to deflect when struck by an undetected obstacle.

Mobile fluid delivery systems according to the invention permit the fluid delivery device to be extended laterally of the vehicle without regard to the nature and extent of potentially interfering obstacles which might be encountered in use. When an obstacle approaches the vehicle, the arm is automatically retracted at the appropriate time to avoid contact with the obstacle and is extended back to the desired operating lateral position when the relative positions of the arm and the obstacle are no longer potentially interfering.

For a fuller understanding of the nature and advantages of the invention, reference should be had to the ensuing detailed description, taken in conjunction with the accompanying drawings.

DETAILED DESCRIPTION OF THE PREFERRED EMBODIMENT

Figure 1:
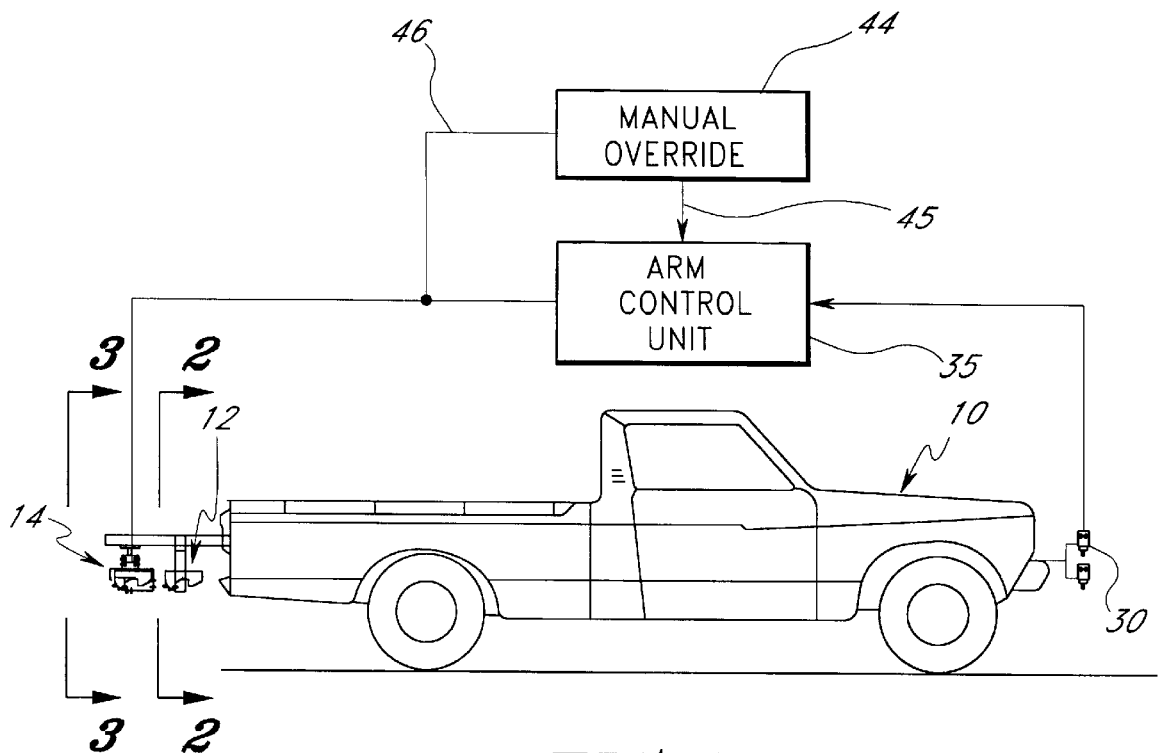
FIG. 1 is a side elevational view of a vehicle illustrating the preferred embodiment of the invention.

Turning now to the drawings, FIG. 1 is a side elevational view of a vehicle incorporating a preferred embodiment of the invention. As seen in this figure, a vehicle generally designated with reference numeral 10 is provided with first and second rear mounted boom assemblies 12, 14. Vehicle 10 may comprise any one of a number of land based vehicles, such as a highway truck, an off-road vehicle, or a railroad car.

Figure 2:
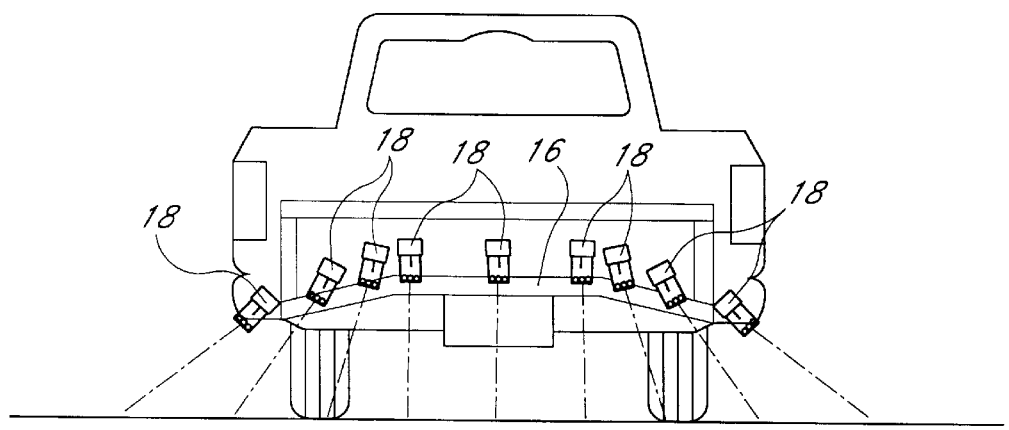
FIG. 2 is rear elevational schematic view taken along lines 2—2 of FIG. 1 illustrating a fixed boom assembly mounted on the vehicle of FIG. 1.

Fixed boom assembly 12 is a conventional arrangement and, as seen in FIG. 2 comprises a fixed boom 16 having a plurality of fluid delivery elements 18 distributed therealong to provide a fluid delivery pattern of appropriate length and width. Fluid delivery elements 18 may comprise liquid spray nozzles, gas valves or any one of a number of known devices used to deliver fluid from a holding tank (not shown) to an area to be subjected to the fluid. Examples of such fluids are herbicides used to control weed growth, fertilizer for plants and vegetation, and paint spraying equipment. Other examples will occur to those skilled in the art.

Figure 3:
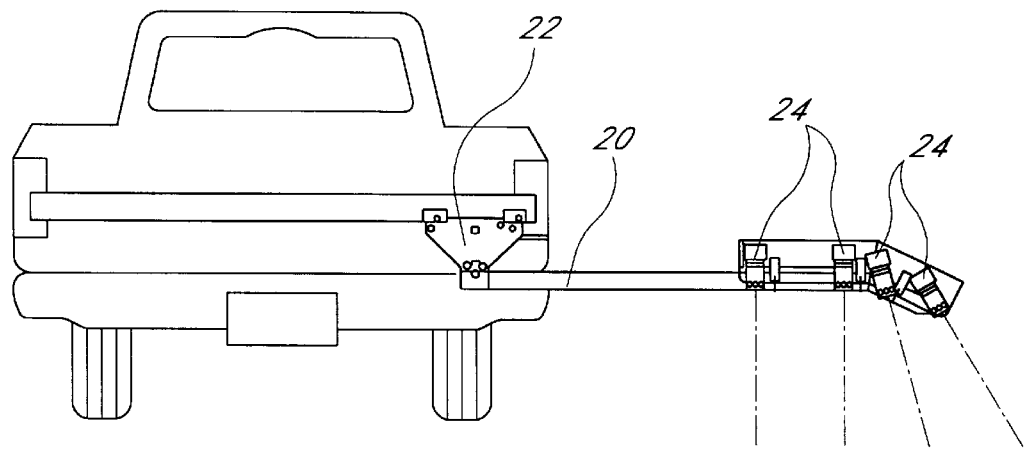
FIG. 3 is a rear elevational schematic view taken along lines 3—3 of FIG. 1 illustrating a movable boom assembly mounted on the vehicle of FIG. 1 with the boom fully extended.
Figure 4:
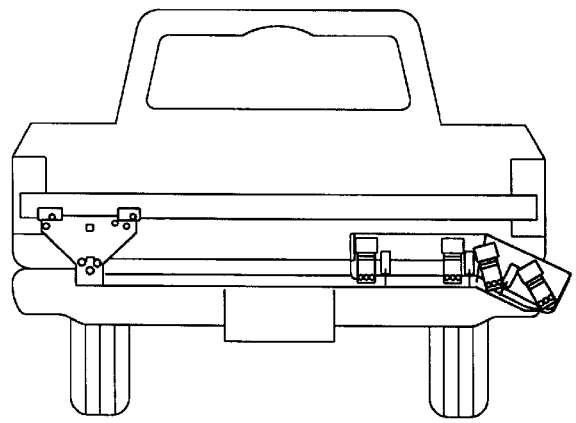
FIG. 4 is a rear elevational schematic view illustrating a movable boom assembly mounted on the vehicle of FIG. 1 with the boom in the fully retracted position.

Movable boom assembly 14 includes an arm 20 and an actuator 22 capable of extending and retracting arm 20 between the fully extended position illustrated in FIG. 3 to the fully retracted position illustrated in FIG. 4. Actuator 22 may comprise any one of a number of known actuators capable of translating boom 20 between the two positions illustrated in FIGS. 3 and 4. Examples of such actuators are an hydraulic actuator, a pneumatic actuator, and an electric linear actuator. Since such devices are well known, further description is omitted to avoid prolixity.

Mounted to the outer portion of arm 20 are a plurality of fluid delivery elements 24 similar in structure and function to fluid deliver elements 18 carried by fixed boom assembly 12. In a specific embodiment of a weed abatement implementation of the invention, fluid delivery elements 24 comprise the weed sensor and spray nozzles of a WeedSeeker Selective Spray System available from Patchen, Inc. of Los Gatos, Calif. Not illustrated in the figures are the common elements employed in any fluid delivery system such as the fluid container, the fluid routing lines, the pump, and the power source. Such units are conventional and details thereof will be apparent to those of skill in the art.

Figure 5:
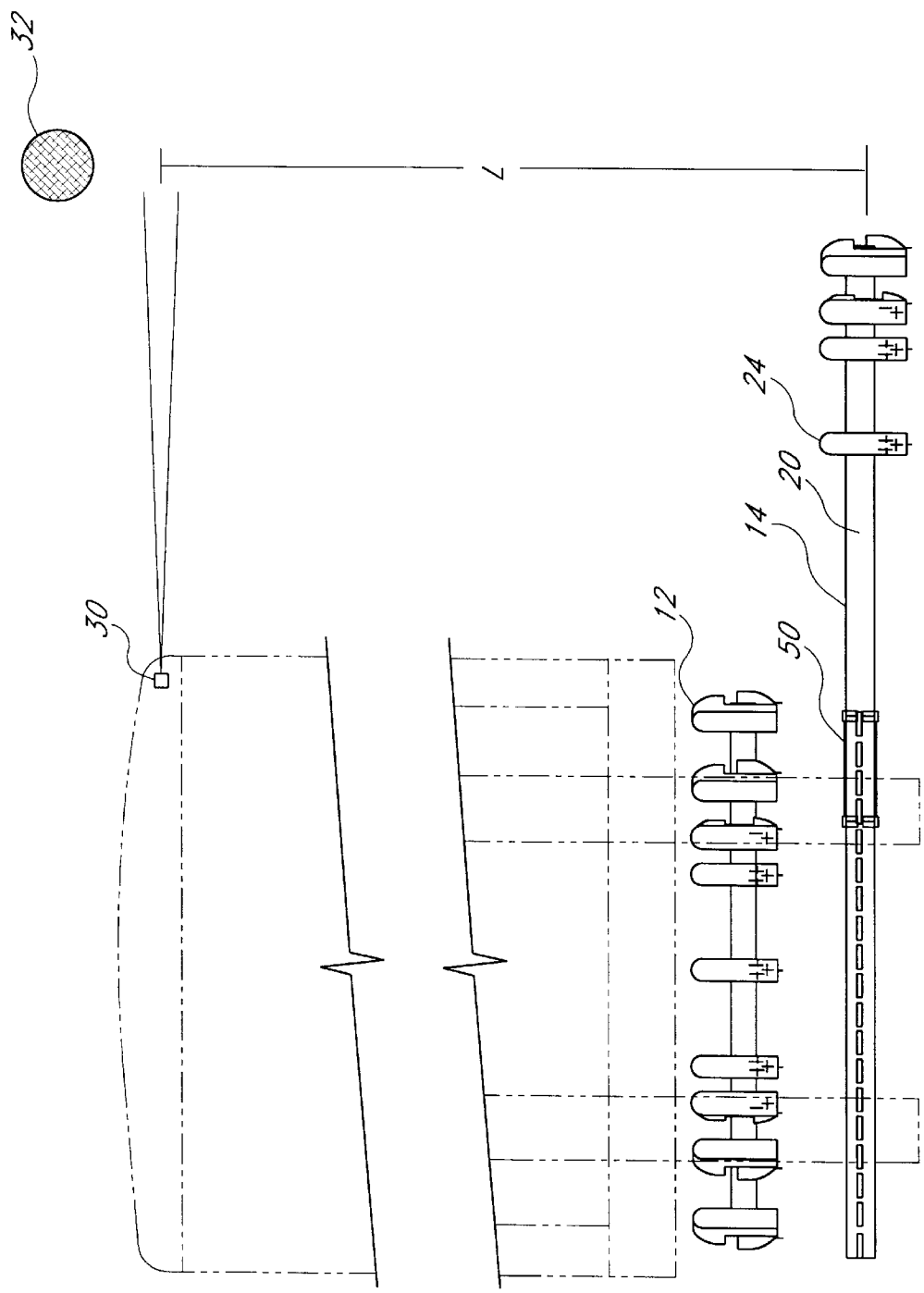
FIG. 5 is a schematic top view of a vehicle showing the relative placement of the sensor on the vehicle.

With reference to FIGS. 1 and 5, a sensor unit 30 is mounted on the forward portion of vehicle 10. Sensor unit 30 preferably comprises a Series 9000 Long Range Diffuse Photoelectric Sensor having a 6.5 degree field of view available from Allen-Bradley Company. Sensor unit 30 is aimed in a direction generally laterally of vehicle 10 and functions to sense the approach of potentially interfering obstacles, such as telephone pole 32, which might potentially interfere with extended arm 20 as vehicle 10 progresses in the direction of obstacle 32. When an approaching obstacle 32 is sensed by sensor unit 30, a signal is delivered to an arm control unit 35 in response to receipt of an impending obstacle signal from sensor unit 30, and arm control unit 35 generates appropriate control signals to operate actuator 22 with appropriate timing to retract arm 20 from the path of obstacle 32 until the obstacle 32 clears the end of arm 20, after which arm control unit 35 generates a control signal to actuator 22 to extend arm 20 back to the original position.

Figure 6:
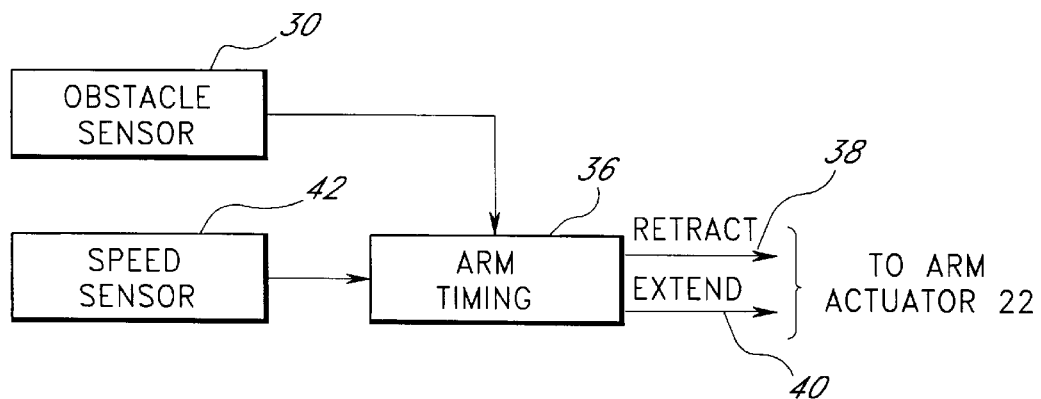
FIG. 6 is a block diagram of a variable cycle arm control unit.

Two alternative types of arm control units 35 can be provided with the system: one unit providing a fixed cycle and one providing a variable cycle. The fixed cycle implementation requires that the vehicle be operated at a constant speed (which is most appropriate for a railroad car implementation). With a fixed vehicle speed, the time at which the arm 20 must be retracted to the FIG. 4 position can be simply calculated from the known speed and the distance D between the location of sensor 30 and the location of arm 20 along the length of vehicle 10. A portion of an arm control unit employing variable cycle time is illustrated in FIG. 6. As seen in this figure, obstacle sensor 30 provides an impending obstacle signal to an arm timing unit 36 having a pair of output terminals 38, 40 for manifesting a RETRACT and an EXTEND signal, respectively. A vehicle speed sensor 42 is coupled as a second input to arm timing unit 36. Vehicle speed sensor 42 may be any one of a number of conventional devices known to those skilled in the art capable of generating a signal representative of the vehicle speed. Arm timing unit 36 calculates the timing of the RETRACT and EXTEND operations for arm 20 from the measured vehicle speed and the fixed distance D between the obstacle sensor 30 and the arm 20. Arm control unit 35 can be implemented using any suitable known analog or digital circuitry. Similarly, arm timing unit 36 may be implemented in either analog or digital form using conventional design and construction techniques.

In some modes of operation, it may be desirable to provide for an optional manual override to enable the vehicle driver or other occupant to manually control the position of arm 20. In such cases, a manual override unit 44 is provided which is capable of disabling arm control unit 35 and enabling a human operator to control the position of arm 20. Manual override unit 44 may be implemented in a variety of ways and contains the functional capability of disabling arm control unit 35 by means of a disable connection 45 and controlling the generation of the RETRACT and EXTEND signals furnished to actuator 22 by means of an additional signal path 46.

In the event of loss of power or other system failure, it is possible that arm 20 could be fixed in the extended position illustrated in FIG. 3. In order to prevent damage to arm 20 and fluid delivery elements 24, a safety breakaway mechanism is incorporated into boom assembly 14 which permits arm 20 to deflect when struck by an undetected obstacle. The breakaway mechanism may comprise a flex joint 50 of conventional design located inboard of arm 20 or any other equivalent mechanism.

As will now be apparent, mobile fluid delivery systems incorporating the teachings of the invention enable the vehicle to be operated without regard to the presence or absence of obstacles which might be encountered by the extended fluid delivery system elements. In addition, the invention may be implemented on a wide variety of vehicles in a wide variety of fluid delivery system applications without requiring major modifications to the vehicle. Most importantly, the vehicle may be operated at optimum speed and along a linear path, or along a contoured path which closely follows the edge of the area to which the fluid is to be delivered.

While the above provides a full and complete disclosure of the preferred embodiments of the invention, various modifications, alternate constructions and equivalents will occur to those skilled in the art. For example, while a specific spray nozzle and sensor have been used in the weed abatement implementation described above, other system elements may be employed, depending on the requirements of a given application. Also, while sensor 30 has been disclosed as preferably mounted on the front of vehicle 10, other locations may be chosen, provided that the retracting mechanism has sufficient time to position the arm 20 to a non-interfering position. In addition, arm 20 need not be fully retracted in response to the generation of an impending obstacle signal from sensor 30—it is only necessary that arm 20 be retracted to a position at which impact with an obstacle is avoided. If desired, additional sensors may be provided to measure the lateral distance of the obstacle from some reference point on the vehicle, and the resulting information can be used to control the amount of inward travel of arm 20 necessary to avoid impact with the approaching obstacle. Therefore, the above should not be construed as limiting the invention, which is defined by the appended claims.

What is claimed is:

1. A mobile system for delivering a fluid to a fluid application area, said system comprising:
   a vehicle;
   an arm carried by said vehicle and movable between a retracted position and an extended position;
   a fluid delivery system carried by said vehicle, said fluid delivery system including at least one fluid delivery device coupled to said arm;
   means for maneuvering said arm between said retracted position and said extended position;
   sensor means for sensing the approach of an obstacle in the path of said arm; and
   control means responsive to said sensor means for causing said arm maneuvering means to retract said arm towards the retracted position when said sensor means senses an approaching potentially interfering obstacle and for extending said arm towards the extended position when the relative positions of the arm and the obstacle are no longer potentially interfering, wherein said control means includes means for operating said arm maneuvering means for a fixed cycle time.

2. The system of claim 1 wherein said fluid delivery device comprises a spray nozzle.

3. The system of claim 1 wherein said arm maneuvering means comprises an hydraulic actuator.

4. The system of claim 1 wherein said arm maneuvering means comprises an electric motor.

5. The system of claim 1 wherein said arm maneuvering means comprises a pneumatic actuator.

6. The system of claim 1 further including a safety breakaway mechanism for enabling said arm to deflect when struck by an undetected obstacle.

7. The system of claim 1 wherein said control means includes means for operating said arm maneuvering means for a variable cycle time.

8. A mobile system for delivering a fluid to a fluid application area, said system comprising:
   a vehicle;
   an arm carried by said vehicle and movable between a retracted position and an extended position;
   a fluid delivery system carried by said vehicle, said fluid delivery system including at least one fluid deliver a device coupled to said arm;
   means for maneuvering said arm between said retracted position and said extended position;
   sensor means for sensing the approach of an obstacle in the path of said arm; and
   control means responsive to said sensor means for causing said arm maneuvering means to retract said arm towards the retracted position when said sensor means senses an approaching potentially interfering obstacle and for extending said arm towards the extended position when the relative positions of the arm and the obstacle are no longer potentially interfering, said control means including means for operating said arm maneuvering means for a variable cycle time, means for measuring the speed of the vehicle and means for computing the length of said variable cycle time in accordance with the measured vehicle speed.

9. The system of claim 1 further including manual override means for enabling a vehicle occupant to override said control means and directly operate said arm maneuvering means.

10. A mobile system for delivering a fluid to a fluid application area, said system comprising:
    a vehicle;
    an arm carried by said vehicle and movable between a retracted position and an extended position;
    a fluid delivery system carried by said vehicle, said fluid delivery system including at least one fluid delivery device coupled to said arm;
    an actuator for moving said arm between said retracted position and said extended position;
    a sensor for sensing the approach of an obstacle in the path of said arm;
    a controller responsive to said sensor for causing said actuator to retract said arm towards the retracted position when said sensor senses an approaching potentially interfering obstacle and for extending said arm towards the extended position when the relative positions of the arm and the obstacle are no longer potentially interfering; and
    a vehicle speed sensor,
    wherein the controller causes the actuator to retract the arm for a variable time depending upon the vehicle speed prior to extending the arm.

11. A mobile system for delivering a fluid to a fluid application area, said system comprising:
    a vehicle;
    an arm carried by said vehicle and movable between a retracted position and an extended position;
    a fluid delivery system carried by said vehicle, said fluid delivery system including at least one fluid delivery device coupled to said arm;
    an actuator for moving said arm between said retracted position and said extended position;
    a sensor for sensing the approach of an obstacle in the path of said arm; and
    a controller responsive to said sensor for causing said actuator to retract said arm towards the retracted position when said sensor senses an approaching potentially interfering obstacle and for extending said arm towards the extended position when the relative positions of the arm and the obstacle are no longer potentially interfering, wherein the fluid comprises herbicide for roadside vegetation.

12. A mobile fluid delivery system for mounting upon a vehicle, the system comprising;
    a movable arm;
    an actuator for moving the arm between an extended position having a first path adjacent to the vehicle and a retracted position having a second path parallel to the first path;
    a fluid delivery device mounted upon said arm for spraying fluid;
    a sensor for generating sensor signals in response to a detected obstacle in the first path; and
    a controller for generating control signals in response to the sensor signals, the control signals directing the actuator to move the arm to the retracted position, wherein the control signals further direct the actuator to move the arm to the extended position after a cycle time.

13. The system of claim 12 further comprising a vehicle speed sensor, wherein the cycle time varies with the measured vehicle speed.

* * * * *